United States Patent [19]

Muffoletto et al.

[11] Patent Number: 4,461,546

[45] Date of Patent: Jul. 24, 1984

[54] DIFFRACTION-LIMITED ACHROMATIC BEAM EXPANDING TELESCOPE

[76] Inventors: C. Verne Muffoletto, 9411 Flagstone Dr., Baltimore, Md. 21234; John B. Goodell, 1201 Southview Rd., Baltimore, Md. 21218

[21] Appl. No.: 391,574

[22] Filed: Jun. 24, 1982

[51] Int. Cl.³ .................... G02B 11/22; G02B 13/14; G02B 23/00

[52] U.S. Cl. ........................... 350/453; 350/1.3

[58] Field of Search ............... 350/453, 1.3, 1.2

[56] References Cited

U.S. PATENT DOCUMENTS 4,171,872  10/1979  Baker ........................... 350/453

Primary Examiner—John K. Corbin
Assistant Examiner—Rebecca D. Gass
Attorney, Agent, or Firm—John F. McClellan, Sr.

[57] ABSTRACT

A laser beam expander provides usable optical performance from 1800A to 12,000A and nearly diffraction-limited optical performance over a spectral range of 2400A to 11,000A without focus adjustment, and with a beam expansion ratio of 20 to 1. Four air-spaced all-spherical-surface lenses are arranged in two pairs in Galilean telescope type series. The first three lenses are biconcave and of fused silica and the fourth lens is biconvex and of calcium fluoride. Working and mounting tolerances are conventional.

12 Claims, 1 Drawing Figure

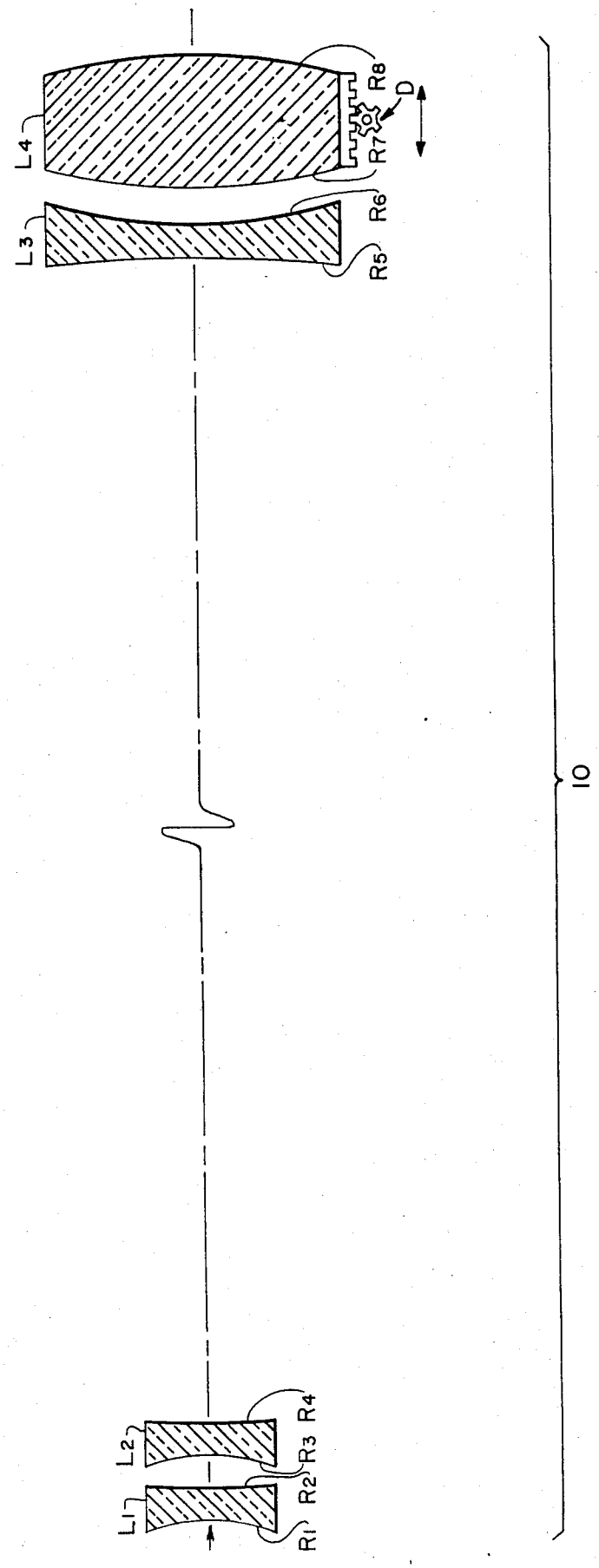

DIFFRACTION-LIMITED ACHROMATIC BEAM EXPANDING TELESCOPE

FIELD OF THE INVENTION

This invention relates generally to telescopic lens systems and particularly to beam expanders.

BACKGROUND OF THE INVENTION

Beam expanding telescopes currently known in the art fail to provide sufficient spectral range for many purposes. Typically they provide a usable spectral range of 3800 A to 6500 A. In this range usable beam expansions of 20 to 1 have been provided in a four-lens system. Three-lense systems have provided beam expansion ratios ranging from 2½ to 1, to 5 to 1. Considerable effort for several years by many people has been applied to the problem of providing laser beam expanders with even marginally increased spectral range, and with usuably low spherical aberration and chromatic aberration.

SUMMARY AND OBJECTS OF THE INVENTION

A principal object of the present invention therefore is to provide a beam expander which produces results that are different in kind rather than in degree, exceeding by an order of magnitude what was before available in spectral range while easily preserving performance of the system, that is nearly diffraction limited. Included in the principal object is that providing a test-proven lens type beam expander with an expansion ratio of 20:1, with usable performance in the range 1800 A to 12,000 A and nearly diffraction limited optical performance in the range 2400 A to 11,000 A, and which throughout this range needs no focus adjustment. Further objects are to provide a system as described which employs only spherical surfaces and which is economical to manufacture.

Yet further objects and advantages and others described are achieved in a four-element, air-spaced, Galilean telescope system of fused silica and calcium fluoride.

Further objects and advantages will be more readily apparent on examination of the drawing FIGURE, in which like reference characters refer to like parts; the FIGURE is a diagrammatic view of an optical system according to this invention.

DETAILED DESCRIPTION

The drawing FIGURE shows the invention diagrammed in embodiment 10. Coaxially disposed in serial relation in beam direction (arrow) and in two pairs are first, second, third and fourth lenses, respectively L1, L2, L3, L4. L1, L2 and L3 are bi-concave and of fused silica. L4 is biconvex and of calcium fluoride. All are of spherical configuration.

Units are decimal inches but any other convenient system may be used to display proportional relations:

| | ON-AXIS THICKNESS | RADIUS | RADIUS TOLERANCE | SPACING |
|---|---|---|---|---|
| L1 | T1 = 0.125 | R1 = 0.7 | ± .010 | S1 = 0.125 ± .002 |
| | | R2 = 5.506 | ± .030 | |
| L2 | T2 = 0.125 | R3 = 0.7 | ± .010 | S2 = 8.5 ± .002 |
| | | R4 = 3.197 | ± .020 | |
| L3 | T3 = 0.125 | R5 = 5.00 | ± .020 | S3 = 0.125 ± .002 |
| | | R6 = 1.967 | ± .015 | |
| L4 | T4 = 0.500 | R7 = 2.272 | ± .015 | |
| | | R8 = 2.204 | ± .015 | |

Diameters may be: L1, 0.5; L2, 0.15; L3, L.125; L4, 1.125.

In the above, manufacturing tolerances are as follows:

Tolerance on all thicknesses = ±0.002; tolerances on all spacings = ±0.002; all surfaces to have smooth U.V. finish and are to be within one wavelength 6328 A°.

Actual tests of a system produced as above prove that in accordance with the actual performances set out in the objects, 90% of the beam is diffraction limited without any focus adjustment, i.e. for changing wavelength.

A further feature of the invention is that the spectral range can be adjustably restricted by moving L4 axially towards and away from L3. This can be done by any suitable conventional means such as an axis-parallel movable mounting for L4, represented by the double-ended arrow, provided that it has 0.0001 inch (0.0025 mm) resolution capability. A rack and pinion drive such as a microscope focussing adjustment can be used for this, and is diagrammatically shown at "D".

The invention may not be completely understood in that it provides such surprising imaging performance over such a surprising wide spectral range. However, it will be appreciated that the combination of composition and proportional configurations contributes importantly to the surprising end results. Known optical principles are applied.

The design principles are as follows:

The large lenses, L3 and L4 partially chromatically correct each other. The small negative doublet comprised of L1 and L2 has no chromatic correction. The negative (overcorrected) longitudinal chromatic aberration of the negative element compensates the residual longitudinal chromatic aberration of the positive doublet in such a way that the two doublets always have a common focal plane; thus always (at all wavelengths) the pair constitutes a telescope even though its angular magnification decreases slightly with increasing wavelength throughout its spectral range. Expansion ratio is greater than 15 to 1.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for laser beam expansion including Galilean telescope type optics having first, second, third and fourth lenses in serial relation in direction of beam passage therethrough, the improvement comprising: means for providing a range of operation from 2400 A to 11,000 A, free from need for focus adjustment throughout said range, including said first, second and third lenses having biconcave surfaces, said fourth lens having biconvex surfaces; said first and second lenses being of fused silica and proximately spaced; and said third and fourth lenses being respectively of fused silica and calcium fluoride proximately spaced relative to each other and distally spaced relative to said first and second lenses.

2. In a system as recited in claim 1, said system having an expansion ratio of greater than 15 to 1; said spacings comprising substantially the following proportions: first lens to second lens, on-axis spacing 0.125; second lens to third lens, on-axis spacing 8.5; third lens to fourth lens on-axis spacing 0.125; the thicknesses of said lenses respectively comprising substantially the following: first lens 0.125, second lens 0.125, third lens 0.125, fourth lens 0.5; the respective surfaces of said lenses, designated as R1 through R8, in succession from the first lens having substantially the following radii taken in sequence along said series of lenses;

R1 0.7, R2 5.506; R3 0.7, R4 3.197; R5 5.0,R6 1.967; R7 2.272; R8 2.204.

3. In a system as recited in claim 1, all said lens surfaces being spherical in contour.

4. In a system as recited in claim 3, said beam expander having an expansion ratio of substantially 20:1.

5. In a system as recited in claim 4 and means for adjustably restricting said spectral range comprising means for moving said fourth lens axially toward and away from said third lens.

6. In a system as recited in claim 3, R1 and R2 being the radii of the first lens surfaces; R3 and R4 being the radii of the second lens surfaces; R5 and R6 being the radii of the third lens surfaces; R7 and R8 being the radii of the fourth lens surfaces; the first lens surface radius R1 and the second lens surface radius R3 being substantially equal.

7. In a system as recited in claim 6, said substantially equal radii being followed in order of increasing radius by R6, R4, R8, R7, R5 and R2.

8. In a system as recited in claim 6, the first lens and the second lens being substantially equal in axial thickness.

9. In a system as recited in claim 8, the third lens being substantially equal in axial thickness to the first lens.

10. In a system as in claim 9, the fourth lens having substantially four times the axial thickness of the first lens.

11. In a system as recited in claim 3, said system providing means for the third and fourth lenses partially to correct each other chromatically, for the first and second lenses to comprise a first, negative doublet having no chromatic correction, for negative, overcorrected longitudinal chromatic aberrations of the third lens to compensate residual longitudinal chromatic aberration of the third and fourth lenses considered as a second, positive doublet in a manner causing said first and second doublets always to have a common focal plane whereby said first and second doublets constitute a telescope, and for said first doublet to correct a small undercorrected spherical aberration of the second doublet.

12. In a system for laser beam expansion including Galilean telescope type optics having first, second, third and fourth lenses, designated for descriptive purposes as: L1, L2, L3 and L4, in serial relation in direction of beam passage therethrough, and having thicknesses T and spacing S from each other, the improvement comprising the combination of L1, L2 and L3 being of fused silica and L4 being of calcium fluoride and of the proportions substantially as set forth below, L1, L2 and L3 having biconcave surfaces and L4 having biconvex surfaces, all said surfaces being spherical, and having respective radii R1 through R8, as follows:

| L1 | T1 = 0.125 | R1 = 0.7 | ± .010 | S1 = 0.125 ± .002 |
|----|------------|----------|--------|-------------------|
|    |            | R2 = 5.506 | ± .030 |                 |
| L2 | T2 = 0.125 | R3 = 0.7 | ± .010 | S2 = 8.5 ± .002 |
|    |            | R4 = 3.197 | ± .020 |                 |
| L3 | T3 = 0.125 | R5 = 5.00 | ± .020 | S3 = 0.125 ± .002 |
|    |            | R6 = 1.967 | ± .015 |                 |
| L4 | T4 = 0.500 | R7 = 2.272 | ± .015 |                 |
|    |            | R8 = 2.204 | ± .015 |                 |

* * * * *